United States Patent

Yatsenko et al.

[11] 3,948,131
[45] Apr. 6, 1976

[54] DEVICE FOR CUTTING MOVING INGOTS, TUBE SKELPS AND ROLLED STOCK

[76] Inventors: Sergei Vasilievich Yatsenko, prospekt Moskovsky, 204/1, kv. 36; Vadim Grigorievich Kononenko, ulitsa Chkalova, 15, kv. 12; Igor Pavlovich Komnatny, ulitsa Cheljuskintsev, 6, kv. 1; Viktor Alexeevich Stelmakh, ulitsa Kirova, 18, kv. 2; Serafim Vasilievich Schekochikhin, 1 Lesoparkovsky pereulok, 5, kv. 76; Stanislav Anisimovich Maznichenko, ulitsa Kharkovskikh divizy, 18, kv. 9, all of Kharkov; Mikhail Karpovich Silichev, ulitsa Michurina, 59, kv. 25, Krasnoyarsk; Vladimir Vladimirovich Lobanov, ulitsa Michurina, 53, kv. 54, Krasnoyarsk; Alexei Ivanovich Fedchenko, ulitsa Michurina, 55, kv. 60, Krasnoyarsk; Leonid Petrovich Babich, ulitsa Michurina, 59, kv. 11, Krasnoyarsk; Levon Khachaturovich Akhnazariants, ulitsa Kosiora, 23, kv. 23; Anatoly Semenovich Saveliev, ulitsa Chkalova, 7, kv. 22, both of Kharkov; Vladimir Feofanovich Merezhro, ulitsa Akademik Pavlova, 5, kv. 105; Alexandr Alexandrovich Vestman, ulitsa Michurina, 12, kv. 42, both of Krasnoyarsk; Vitaly Evgenievich Strizhenko, ulitsa Osnovyanskaya, 56, Kharkov; Viktor Sergeevich Pravdin, Trinadtsatay Parkovaya ulitsa, 38, korpus 1, kv. 7, Moscow; Veniamin Veniaminovich Fulmakht, Nevolesnaya ulitsa, 6a, kv. 16, Moscow; Boris Vasilievich Fitilev, Lomonosovsky prospekt, 15, kv. 123, Moscow; Dmitry Petrovich Evteev, Sirenevy bulvar, 27, korpus 3, kv. 45, Moscow; Alexandr Grigorievich Salenek, ulitsa Popovicha, 18, kv. 8; Georgy Fedotovich Dadykin, ulitsa Martenovskaya, 18, both of Bekabad Tashkentskoi oblasti; Ivan Savelievich Onuchko, ulitsa Cheljuskina, 15, Kharkov; Nikolai Nikitovich Golodov, ulitsa Lenina, 12, kv. 90; Jury Alexandrovich Kamensky, ulitsa Aleyas, 37/39, kv. 10, both of Liepaya Latviiskoi SSR, all of U.S.S.R.

[22] Filed: Mar. 18, 1974

[21] Appl. No.: 452,398

Related U.S. Application Data

[63] Continuation of Ser. No. 311,644, Dec. 4, 1972, abandoned, which is a continuation of Ser. No. 131,137, April 5, 1971, abandoned.

[52] U.S. Cl. .................. 83/308; 83/316; 83/623; 83/639
[51] Int. Cl.² ........................................ B23D 25/04
[58] Field of Search ............ 83/623, 308, 318, 639, 83/316

[56] References Cited
UNITED STATES PATENTS

| 642,631 | 2/1900 | Rothe | 83/623 |
| 3,207,406 | 9/1965 | Bowman | 83/623 X |
| 3,466,960 | 9/1969 | Boborykin et al. | 83/623 X |
| 3,487,736 | 1/1970 | Kaiser et al. | 83/639 X |
| 3,636,808 | 1/1972 | Taminaga | 83/639 X |

*Primary Examiner*—J. M. Meister
*Attorney, Agent, or Firm*—Holman & Stern

[57] ABSTRACT

Apparatus for severing moving members such as ingots, tube skelps and rolled stock, comprising cooperating cutters disposed transversely to the direction of movement; power means for simultaneously urging the cutters together from opposite sides of the member being cut; pneumatic means for urging the cutters apart; and means for automatically disengaging the cutters from the severed member through use of the force of the moving member.

6 Claims, 5 Drawing Figures

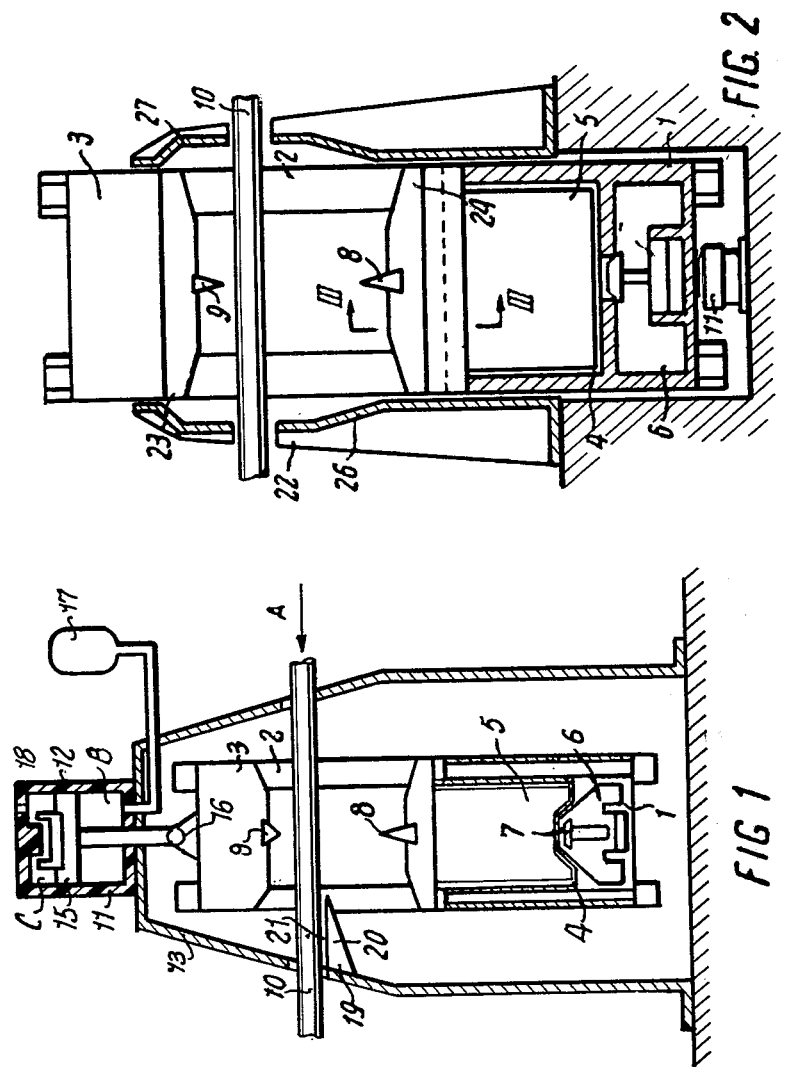

DEVICE FOR CUTTING MOVING INGOTS, TUBE SKELPS AND ROLLED STOCK

This application is a continuation of application Ser. No. 311,644, filed Dec. 4, 1972, now abandoned which in turn is a continuation of application Ser. No. 131,137, filed Apr. 5, 1971, now abandoned.

FIELD OF THE INVENTION

The present invention relates to apparatus for mechanical working of metals and more specifically it relates to pulse or power operated devices for cutting moving ingots, tube skelps and rolled stock, these devices being actuated by the energy of a power blast.

Most successfully, the present invention can be used for cutting horizontally-moving hot ingots in continuous, steel-casting plants, as well as for cutting the tube skelps and rolling stock in the production lines of rolling mills.

PRIOR ART GENERALLY

Known at present are horizontal pulse operated machines for cutting vertically-fed ingots which generally comprise two cutters moving in the same plane perpendicularly to the direction of ingot movement, one of said cutters being secured to a rod of a pulse chamber, while the other one being fastened to an anvil which is rigidly connected with the pulse chamber which constitutes an integral power frame. The pulse chamber has a space filled with a working medium for producing a power blast, and the anvil is connected to the pulse chamber in such a manner that the blast in the pulse chamber pushes the cutters towards each other. The pulse chamber and the anvil are mounted on a framework resting or a fixed hinged support. In these prior art machines, after cutting the ingot the cutters return to the initial position by means of a hydraulic system (see, for exmple, U.S. Pat. No. 3,466,960).

The hydraulic system of these prior art machines operates at a relatively low speed which increases the duration of the complete working cycle (the cutting stroke takes from 0.01 to 0.02 s and the return stroke, from 6 to 10 sec.) and this delay generally prevents the use of this device in multiple-groove, continuous steencasting plants of a high speed output. The difference between the speed of the moving ingot and the operation of the hydraulic system which returns the cutters to the initial position results in excessive jamming of the cutters in the ingot, thus retarding the efficiencies that can be attained in the process of cutting and pouring.

The prior art device cannot be used in the multiple-groove, continuous steel-casting plants for another reason in that the horizontal arrangement of the pulse chamber and anvil on the frame work makes it impossible to place the device between the ingots discharged from the plant (the distance between the ingots being from 0.5 to 0.8 m).

SUMMARY OF THE INVENTION

The main object of the invention resides in providing a quick-acting device for cutting moving ingots so that this device is suitable for use in the multiple-groove, continuous steel-casting plants for cutting horizontally-moving ingots, and eliminating the possibility of the cutters jamming in the ingot during and/or after cutting.

This object is achieved by providing a device for cutting moving ingots, tube skelps and rolled stock comprising two cutters arranged in one and the same plane and movable perpendicularly to the direction of flow of the material to be cut, one of the cutters being secured to a rod of a pulse chamber having a space for guiding the rod, and another space filled with the working medium for producing a blast, while the other cutter is secured on the anvil rigidly connected with the pulse chamber, thus constituting an integral frame so that after the blast in the pulse chamber, the cutters move towards each other, in which, according to the invention, there is damper connected by a movable member movable with the power frame and designed to return the cutters quickly to the initial positions after the cut, the damper being installed on a portal frame and its movable member being articulated to the anvil of the power frame which is tree to move with respect to said portal frame.

The damper ensures quick withdrawal of the cutters upon completion of the cutting stroke, while an articulated joint allows the frame to be suspended freely from the device framework, owing to this the pulse chamber can be arranged vertically and such an arrangement has made it possible to provide a device for cutting a horizontally-moving ingot which is suitable for use in the multiple-groove continuous steel-casting plants with closely-spaced grooves.

With the power frame is secured to an articulated joint, it is practicable that the framework incorporate a wedge having an inclined surface and a horizontal surface; this wedge being installed so that its pointed edge is directed against the movement of the material (ingot), its horizontal surface is set as close as possible and parallel to the material, and the wedge enters the clearance between the material and the pulse chamber rod when the power frame is turned around the joint by the force of the moving ingot.

This means is necessary for ensuring positive extraction of the cutter secured on the pulse chamber rod if said cutter gets jammed in the ingot.

To facilitate assembly and disassembly during repairs and servicing, the pulse chamber of the power frame moving in the guides can rest on the movable element of the pneumatic damper.

It is practicable that the damper should be made in the form of a pneumatic, piston-type shock, absorber whose under-piston space communicates with a receiver while the above-piston space is in communication with the atmosphere and includes with a hydraulic damper.

Such a design of the damper ensures a high speed on the return stroke of the power frame carrying one of the cutters. The receiver reduces the pressure rise in the under-piston space and thus excludes excessive consumption of power which, in turn, gives an economy in the working medium. The hydraulic damper is required for impact-free stopping of the pneumatic shock absorber piston in the return of one cutter to its topmost position.

DESCRIPTION OF THE PREFERRED EMBODIMENT

These and other details will become apparent from a consideration of the following description by way of example with reference to the accompanying drawings, in which:

FIG. 1 is a diagramatic of the device according to the invention a side elevational view, partly cut away;

FIG. 2 shows diagramatically another embodiment of the device according to the invention:

Figure 5:
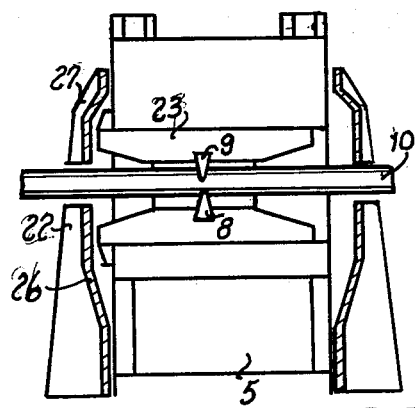
FIG. 5 illustrates the cutters and wedge with the carriage in a jammed position.

The device for cutting the moving ingots comprises a pulse chamber 1 (FIG. 1) and an anvil 3 connected with said chamber by means of power columns 2, these parts making up an integral power frame.

The pulse chamber 1 contains a space 4 for guiding a rod 5 and a space or chamber 6 filled with a working medium for producing a power blast. To prevent the components of the working medium from escaping into the space 4 from the space 6 before the blast, the space 6 is provided with a closing suitable valve device 7. The rod 5 carries a cutter vertically extending 8 interacting with a depending cutter 9 secured to the anvil 3 and arranged generally coplanar with the cutter 8.

The anvil 3 and the chamber 1 are combined into the power frame in such a manner that after a power blast in the space 6 the cutters 8 and 9 move towards each other in the direction perpendicular to the movement of the ingot 10 (the movement of the ingot is shown by arrow A in the drawing).

For rapid and impact-free returning of the power frame to the initial position, for quick withdrawal of the cutters 8 and 9 after cutting the ingot 10, also for reducing the inertia loads on the elements of the device, the latter is provided with a damper in the form of a pneumatic shock absorber 11 whose body 12 is installed on a portal frame 13 while the rod 14 of the piston 15 is connected by a an articulated joint 16 with the anvil 3 so that the power frame is freely suspended from the portal frame 13.

The under-piston space B of the pneumatic shock absorber 11 is in communication with a receiver 17 for reducing the pressure rise in this space during the cutting stroke.

The above-piston space C of this shock absorber 11 communicates with the atmosphere (see FIG. 1) and is provided with a hydraulic damper 18 which contributes to the impact-free stopping of a piston 15 of the pneumatic shock absorber 11 in the topmost position.

For positive extraction of the cutters 8 and 9 from the ingot 10 in case they get jammed (see FIGS. 4 & 5), there is a wedge 19 rigidly secured to the frame 13. This wedge has an inclined surface 20 and a horizontal surface 21 and is installed in such a manner that its pointed, terminal end is directed into or toward the direction of movement a of the ingot 10 while its horizontal surface 21 is set as close as possible and parallel to the plane of movement of said ingot.

The wedge 19 enters the gap between the ingot and the rod 5 of the chamber 1 when the power frame is canted about the joint 16 by the force of the moving ingot 10.

In another version of the device, the assembly and disassembly during repairs and servicing are facilitated by installing the pneumatic shock absorber 11 (FIG. 2) under the power frame and the pulse chamber 1 rests on the movable member of said shock absorber 11.

In this later case, the possibility of the cutters 8 and 9 jamming in the quickly-moving ingot 10 is prevented by installing the power frame of the device in a rigid framework 22 which prevents inclination of the power frame and, together with it, the canting of cutters 8 and 9 in relation to the longitudinal axis of the ingot 10 if the cutters should attempt to follow the ingot as it moves thereby.

To ensure the simultaneous motion of the cutters into the ingot 10 within the time required for withdrawing the cutters from it, the cutters 9 and 8 are mounted on slides or carriages 23 and 24 respectively moving in the slots or ways 25 (FIG. 3) of the rod 5 and anvil 3. The framework 22, accommodating the power frame, has guides or cam surfaces 26 and 27 for returning the movable slides 23 and 24 to their initial position of FIG. 2.

The device illustrated in FIG. 1 and 4 operates as follows: in the initial position the ingot 10 moves between the rod 5 and the anvil 3, which carry the cutters 8 and 9, respectively.

The space B of the pneumatic shock absorber 11 and the receiver 17 communicating with it, are filled with compressed air to a pressure at which the piston 15 of the pneumatic shock absorber 11, when in the topmost position developes a force sufficient to keep the power frame of the device in its topmost position.

After introducing the working medium into the space 6 of the pulse chamber 1 and after a power blast, the valve device 7 opens and the high-pressure products of combustion enter the space 4, substantially instantaneously pushing the rod 5 and the cutter 8 at a high speed against the ingot 10. Simultaneously, the products of combustion push the pulse chamber 1 in the opposite direction; connected rigidly to the pulse chamber 1 by the power columns 2 is the anvil 3 carrying the cutter 9, which also moves downwardly against the ingot 10 from the direction opposite to the movement of the cutter 8. Being brought together, the cutters sever the ingot. The rod 14 and the piston 15 of the pneumatic shock absorber 11 are articulated at 16 to the anvil 3 and move simultaneously with the latter. The volume of space B is reduced and the compressed air escapes from it into the receiver 17; this eliminates with the necessity for additional compression and resultant excessive expenditure of energy.

After the cutting stroke, the rod 5 goes down under its own weight into the space 4 of the pulse chamber 1, thus withdrawing the cutter 8 from the ingot 10. The compressed air flowing from the receiver 17 into space B of the pneumatic shock absorber 11 exerts pressure on the piston 15 lifting the latter to the topmost position by means of rod 14 and thus withdrawing the cutter 9, carried by the anvil 3, from the ingot 10.

In view of the fact that a certain time is required for the cutters 8 and 9 to withdrawn from the moving ingot 10, the latter is followed in the direction of its movement by turning the power frame of the device around the axis of the articulated joint 16 together with the cutters 8 and 9 secured on the rod 5 of the pulse chamber 1 and on the anvil 3, respectively.

Figure 4:
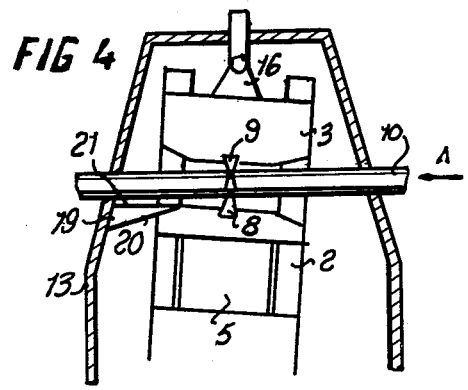
FIG. 4 illustrates the cutters and wedge in a jammed position relative to a workpiece being cut.

If the cutters 8 and 9 get jammed in the ingot 10 for some reason (FIG. 4), the power frame of the device is forced by the moving ingot around the axis of the joint 16 of the rod 14 of the pneumatic shock absorber 11 and the pointed end of the wedge 19 installed on the portal frame 13 enters between the ingot 10 being cut and the rod 5 of the pulse chamber 1 (as shown in FIG. 4). When the power frame turns further around the axis of the joint 16 which takes place under the force of the moving ingot, the rod 5 with the cutter 8 are forced apart and withdrawn because the horizontal surface or component of the wedge thrusts against the ingot 10 and its inclined surface 20 engages against the rod 5.

Figure 3:
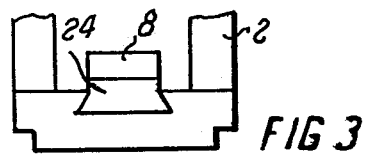
FIG. 3 is a section taken substantially along line III—III in FIG. 2.

In the embodiment of the device illustrated in FIGS. 2, 3 and 5, after the power blase in the space 6 of the pulse chamber 1, the rod 5 with the cutter 8 moves towards the ingot 10 while the pulse chamber 1 and the anvil 3 secured rigidly to it, move in the opposite direction. In this case the cutter 9 mounted on the anvil 3 moves towards the cutter 8 and they sever the ingot 10. The motion of the pulse chamber 1 compresses the air in the pneumatic shock absorber 11 as shown in FIG. 2.

After the ingot 10 has been cut, the rod 5 and the cutter 8 return under their own weight into the space 4 of the pulse chamber 1, thus withdrawing the cutter 8 from the ingot.

The air compressed in the pneumatic shock absorber 11 pushes upwardly and returns the pulse chamber 1 of the power frame together with the anvil 3, to the initial topmost position. The cutter 9 mounted on the anvil 3 is thus withdrawn from the ingot.

The ingot 10 moves in due course of the period of time required for the withdrawal of the cutters 8 and 9, due to the transverse movement of the slides 23 and 24, carrying the cutters 8 and 9, respectively, through the slots 25 of the rod 5 and anvil 3, these slides, with their cutters, being moved by the pressure of the ingot 10 (as shown in FIG. 5).

After the cutters 8 and 9 have been withdrawn from the ingot 10, the slides 23 and 24 move to the initial position along the slots 25 due to the provision on the framework 22 of the inclined camming guides 26 and 27, which the slides 23 and 24 engage as the rod 5 returns into the space 4 of the pulse chamber 1 and the anvil 3 returns to the topmost position under the pressure of air compressed in the pneumatic shock absorber 11.

What is claimed is:

1. Apparatus for serving continuously moving members such as ingots, tube skelps, rolled stock and the like, comprising in combination:

displaceable power chamber means including a power chamber, rod means in said power chamber for movement upon the generation of a power pulse in said power chamber, said rod means including a first cutter for movement therewith for engaging the member to be cut in a direction substantially transverse to the direction of movement of the moving member;

anvil means in opposed relation to said power chamber means and including a second cutter in substantially aligned, cooperating relation to said first cutter for engaging the moving member from a direction opposite the first cutter;

means operatively connecting said anvil means to said power chamber means for movement therewith in a direction opposite that of the rod means whereby the cutters move towards each other in a severing stroke in response to a power pulse in said power chamber causing said rod means movement; and means operatively connected to said cutters for separating said cutters substantially after a cutting stroke has been effected, said last mentioned means comprises a frame surrounding said cutters, said cutters including means permitting movement thereof relative to said rod means and anvil means for movement of the cutters in the same direction the member being cut is being moved, said frame including camming means for engaging and orienting said cutters into an operative position and orienting said cutters into an operative position whereby impacted cutters in the member being cut are dislodged by engagement of the frame with the means permitting the relative movement of the cutters with respect to the rod and anvil means, said means permitting relative movement of the cutters including a pair of carriage members, one carriage member being attached to the rod means and the other carriage member being attached to the anvil means, each cutter being mounted on a respective carriage member, the carriage members being mounted in slots in the rod means and anvil means for movement in the direction in which the member is being moved.

2. The apparatus as claimed in claim 1 in which said last mentioned means comprises an energy storing portion for absorbing some of the force generated during each power pulse generating a power stroke, and means operatively connected to said power chamber means and subject to the force of the stored energy for forcibly urging the cutters apart after a severing stroke is effected.

3. The apparatus as set forth in claim 2 in which said last mentioned means comprises damper means including a moveable element subject to the force generated and stored.

4. The apparatus as claimed in claim 3 including a portal frame upon which said damper means is mounted, said movable element depending through said portal frame, means connecting said anvil means in articulated relation to said element.

5. The apparatus as claimed in claim 3 in which said damper means comprises a pneumatic shock absorbing assembly and said moveable element comprises a piston, said piston forming variable-volume chambers on opposite sides thereof, the chamber at one side of said piston communicating with the atmosphere, and a pressure-storing receiver means in communication with the other side of said piston.

6. Apparatus for severing continuously moving members such as ingots, tube skelps, rolled stock and the like, comprising in combination: displaceable power chamber means including a power chamber, rod means in said power chamber for movement upon the generation of a power-pulse in said power chamber, said rod means including a first cutter for movement therewith for engaging the member to be cut in direction substantially transverse to the direction of movement of the moving member; anvil means in opposed relation to said power chamber means and including a second cutter in substantially aligned, cooperating relation to said first cutter for engaging the moving member from a direction opposite the first cutter; means operatively connecting said anvil means to said power chamber means for movement therewith in a direction opposite that of the rod means whereby the cutters move towards each other in a severing stroke in response to a power pulse in said power chamber causing said rod means movement; and means operatively connected to said cutters for separating said cutters substantially after a cutting stroke has been effected, said means for separating said cutters including an energy storing portion for absorbing some of the force generated during each power pulse generating a power stroke, and means operatively connected to said power chamber means and subject to the force of the stored energy for forcibly urging the cutters apart after a severing stroke is effected, said last mentioned means having a damper means including a movable element subject to the force generated and stored, a portal frame upon which said damper means is mounted, said movable element depending through said portal frame, means connecting said anvil means in articulated relation to said element, and wedge means including an operative end portion directed in opposition to the direction of articulation of said anvil whereby the second cutter, when impacted in the member being cut and moving therewith, is engaged by said wedge means so that movement of the member causes it to be separated from the impacted cutter.

* * * * *